Patented Mar. 9, 1948

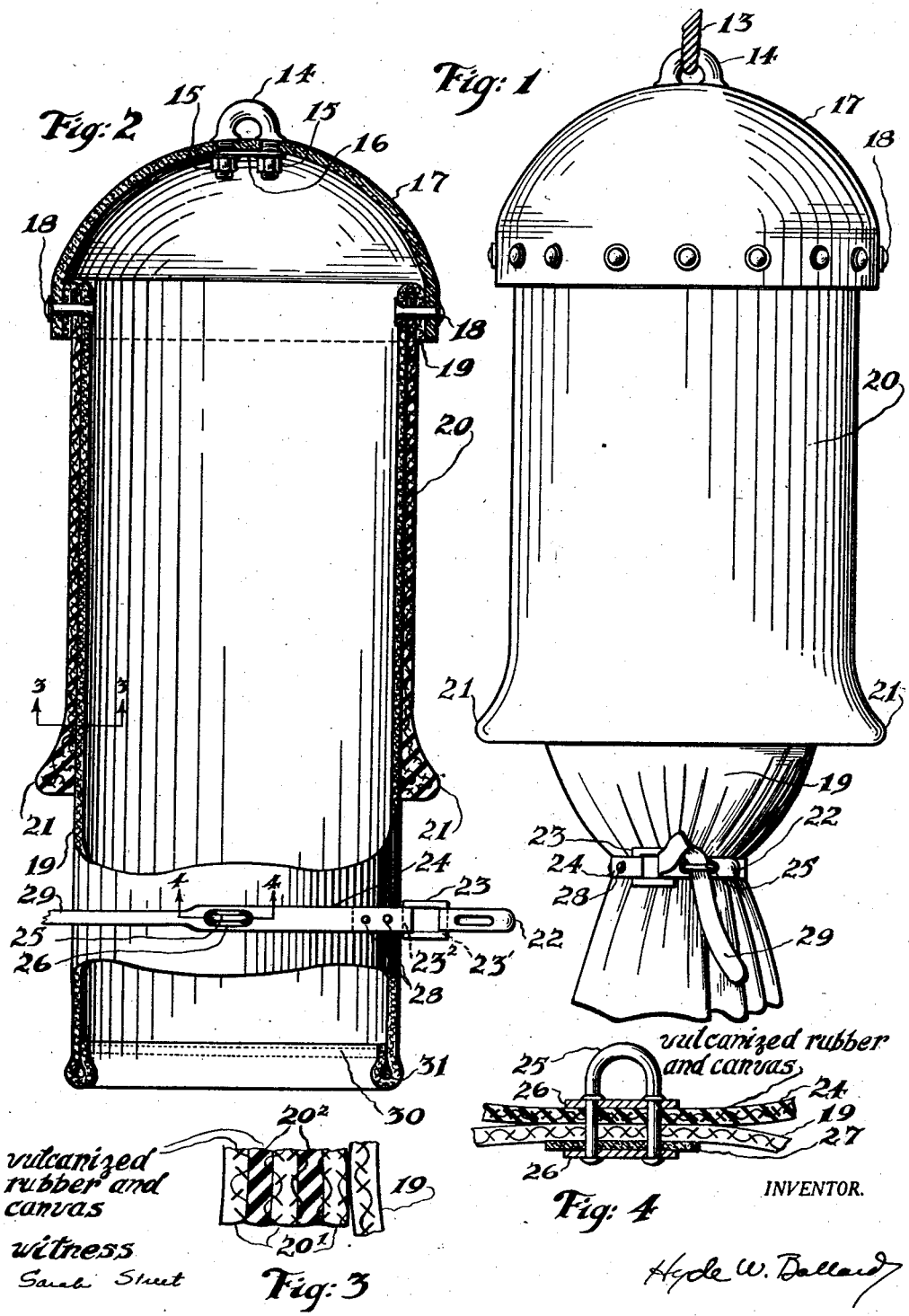

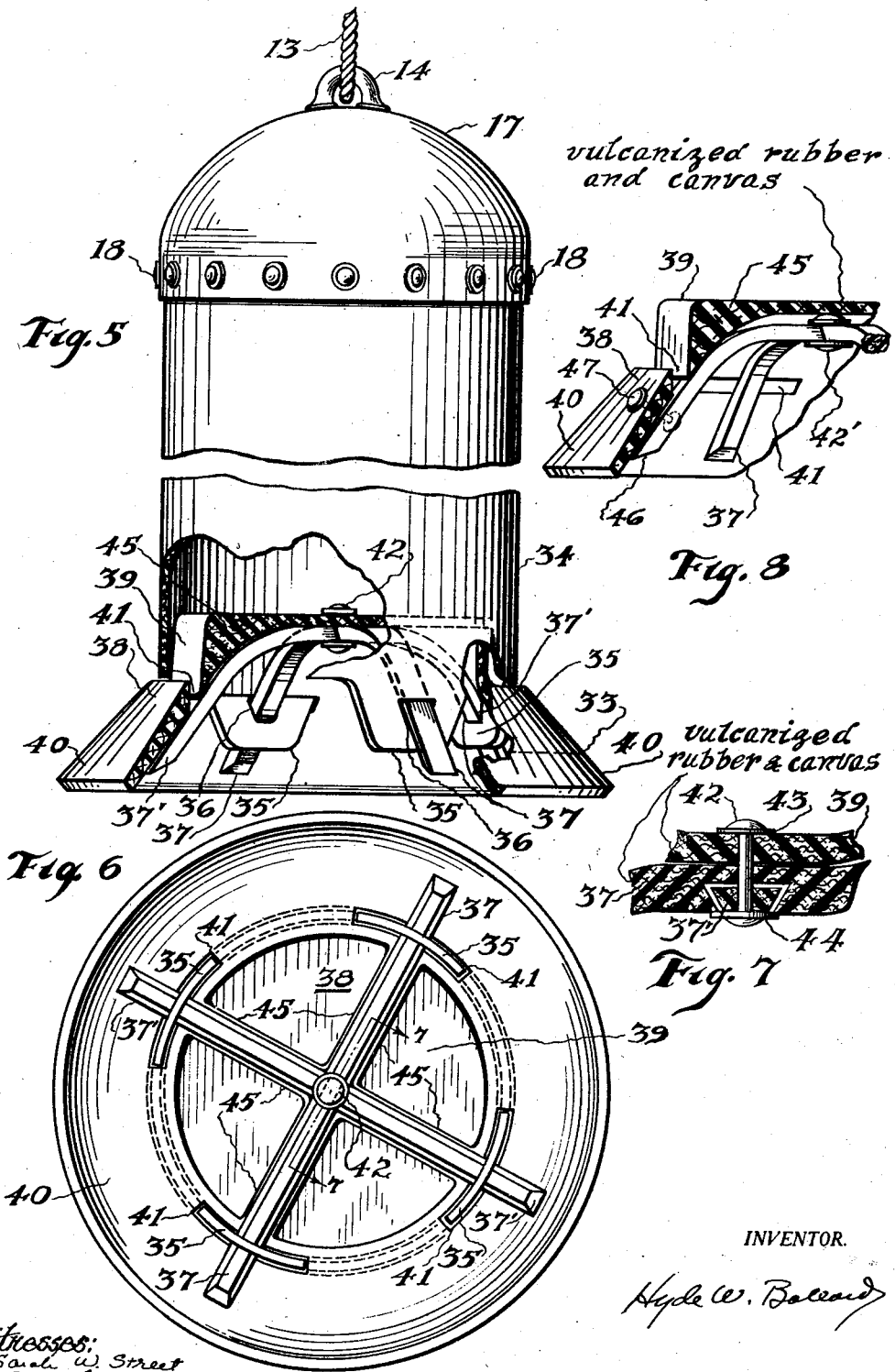

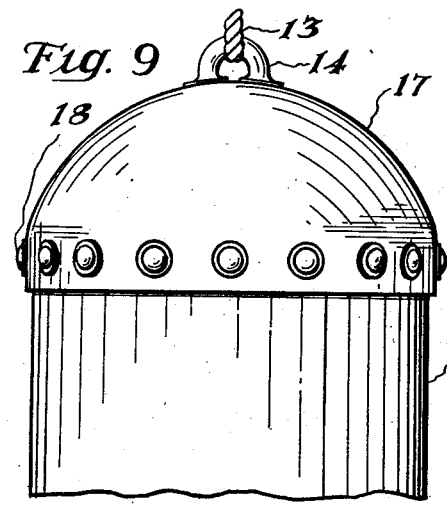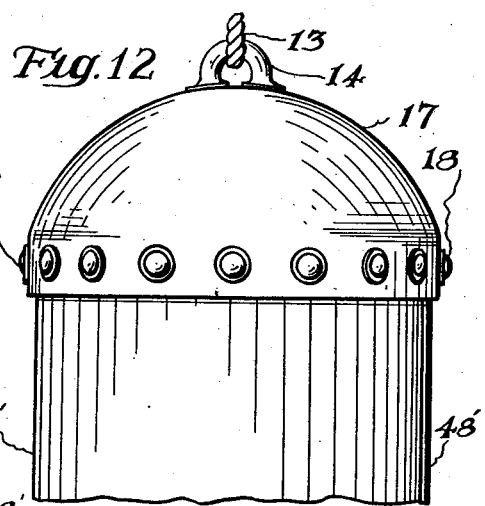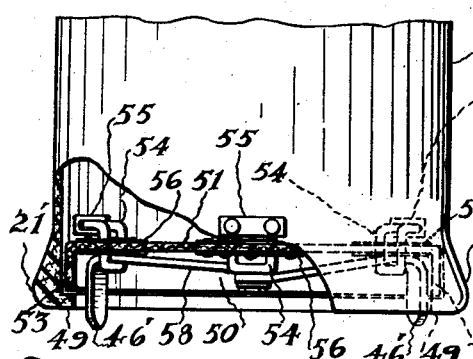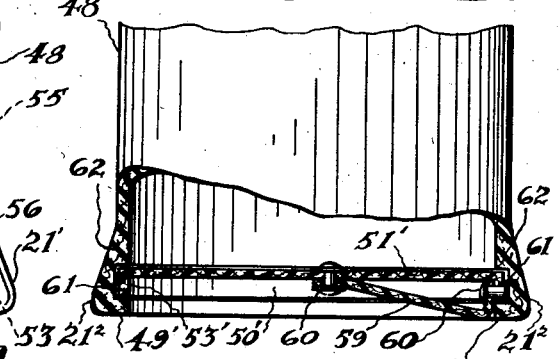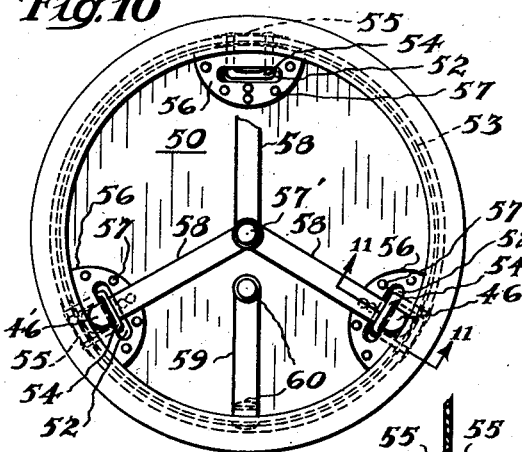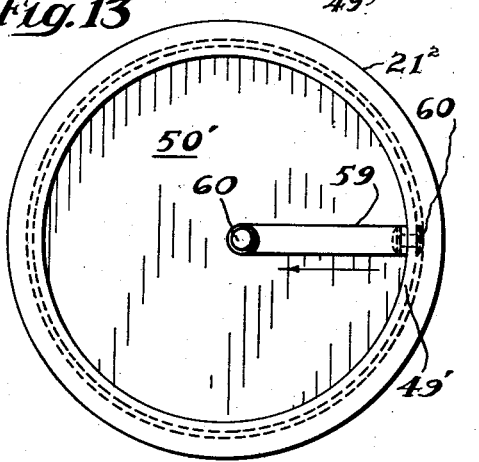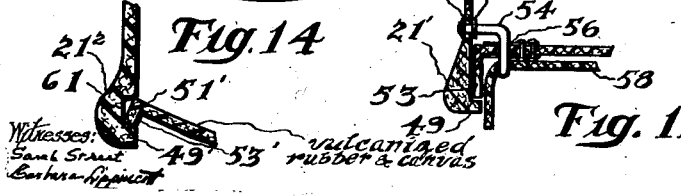

2,437,372

UNITED STATES PATENT OFFICE 2,437,372

PICKUP AND DELIVERY CONTAINER

Hyde W. Ballard, Merion, Pa., assignor to All American Aviation, Inc., Wilmington, Del., a corporation of Delaware Application April 12, 1943, Serial No. 482,830

21 Claims. (Cl. 258—1.2)

My invention relates to cargo containers and particularly containers used in making deliveries to and from aircraft in flight.

Cargo containers heretofore used in air pickup and delivery service have proved to be very unstable when trailing from the aircraft.

One form of instability is evidenced by more or less rapid rotation of the container along a longitudinal axis through the towing eye. This results in such serious twisting and kinking in the towing loop that the release mechanism fails to function properly.

Another form of instability that may become exceedingly dangerous when the container is trailed in the slipstream consists of gyrating or whipping motion so violent that the skin of the airplane may be punctured or the control mechanism rendered inoperative.

The present invention contemplates a container which will not oscillate, gyrate nor spin when being towed and which has sufficient resilience and ruggedness to withstand repeated deliveries on frozen or rocky ground from an aircraft in flight.

Another object of my invention is to provide a cargo container whose center of pressure is well behind its center of gravity when trailed behind an aircraft.

A main object of my invention is to provide a flare for an air cargo container which prevents spinning and gyrating.

A further object of my invention is to provide a combined lid and flare for an air cargo container which trails behind an aircraft in flight without spinning or whipping.

Another object of my invention is to provide a cargo container having its center of pressure at or near its trailing edge.

Another object of my invention is to provide a rugged cargo container for delivery from an aircraft in flight using no metal for reinforcing.

A further object of my invention is to provide a cargo container which retains its shape after being delivered from an aircraft at high speed.

Another object of my invention is to provide a flared cargo container having a composite rubber and duck body member.

Another object of my invention is to provide a cargo container having a heavy flexible reinforcing ring which retains its shape after being delivered from an aircraft at high speed.

Another object of my invention is to provide resilient thongs or straps for air cargo container closures.

Another object of my invention is to provide a closure for an air cargo container which is secured by resilient flexible straps.

Figure 1 is a side elevation of one form of cargo container with canvas bag closed.

Figure 2 is a broken longitudinal section of the structure shown in Figure 1 showing the canvas bag open.

Figure 3 is an enlarged partial section taken on line 3—3 of Figure 2 showing the composite construction of the skirt and flare.

Figure 4 is a section taken on line 4—4 of Figure 2.

Figure 5 is a side elevation partly cut away of a cargo container having a removable lid.

Figure 6 is a bottom view of Figure 5.

Figure 7 is a section taken on line 7—7 of Figure 6.

Figure 8 is a side elevation partly cut away of a modified form of container lid and fastening device.

Figure 9 is a side elevation partly cut away of a modified form of container having a removable lid.

Figure 10 is a bottom view of Figure 9.

Figure 11 is a section taken on line 11—11 of Figure 10.

Figure 12 is a side elevation partly cut away of a slightly modified form of Figure 9.

Figure 13 is a bottom view of Figure 12.

Figure 14 illustrates the sealing action of the lid of Figure 12 when subjected to internal stress.

Similar numerals refer to similar parts throughout the several views.

Referring now more particularly to the drawings, the container illustrated in Figures 1 and 2 is comprised of a hemispherical dome 17 preferably constructed of hard fiber or other shock resistant material to which is bolted an eye 14 secured by nuts 15 and washer 16. The pick-up and towing loop 13 passes through eye 14. A composite canvas and rubber skirt 20 is riveted to the dome 17 by rivets 18. Canvas bag or pouch 19 is lapped over the upper edge of skirt 20 so that it is also secured by rivets 18.

At the bottom or trailing edge of skirt 20 an annular flare 21 of substantially larger diameter than the outside diameter of the skirt is provided. In the preferred form, the skirt 20 is integral with the flare 21 but it will be understood that the flare 21 may be manufactured separately from skirt 20 and attached thereto during the process of assembly.

Figure 3 illustrates the construction of the skirt and flare showing alternate layers of canvas 20' and rubber 20². It will be understood that the flare 21 may begin at a point nearer the dome 17 if desired, the outside shape of the entire skirt may be in the form of a truncated cone.

The preferred form, as illustrated, will, in general, be cheaper to make and will provide greater rigidity at the trailing edge with less weight.

The optimum outside diameter of the flare with respect to the outside diameter of the skirt proper depends principally upon the length of this skirt, the weight of the empty container and the speed with which it is being trailed.

It has been found that a container weighing between 15 and 18 lbs. empty, trailing at air speeds of 90 to 100 M. P. H., and having a skirt about 20 inches long with an outside diameter of 12½ inches at the dome, will be quite stable if constructed with a flare having an outside diameter of 15 inches and commencing about 3 inches forward of the trailing edge of the skirt.

If air speeds in excess of 100 M. P. H. are contemplated the amount of flare must be correspondingly increased to maintain stability.

Canvas bag 19 extends farther back than the rear edge of flare 21 and preferably is closed by a strap.

The band of hasp 22 (Figure 2) is looped about the forward cross bar 23' of a generally rectangular open buckle 23, called a square, and is then welded to itself. The rear cross bar 23² of the open buckle or square is similarly connected to strap 24. The staple 25 is inserted through backing plates 26 and leather backing strip 27.

The use of a strap for closure is not new but I believe that I am the first to use a rubberized strap and I get excellent results by its use. I prefer to form the strap here from a piece of rubber belting having textile fibers running lengthwise therein. This construction provides an exceptionally strong binding which will not break or stretch when the container is delivered thereby spilling the contents and which retains its original length indefinitely after hard usage.

The strap is, of course, not welded to itself but the end of the strap loop is riveted to the body of the strap by rivets 28. This construction permits the square to turn freely with respect to the strap and the hasp and allows them to turn freely on the bars of the square. The length of strap between the staple and the square should be long enough to allow quick closing and yet short enough to prevent the loss of any cargo from the canvas bag.

The otherwise free strap end 29 is of approximately the same length as the circumference of the skirt. The lower edge 30 of the canvas bag is folded over and sewed about a length of rope 31, providing an enlargement which prevents the bag from pulling through the loop formed by strap 24 when in the closed position seen in Figure 1.

The canvas bag is closed by wrapping free end 29 of strap 24 around the bag 19 and then inserting it in square 23. By pulling on the free end of the strap, the bag is gathered in until hasp 22 fits over staple 25. End 29 is then inserted through staple 25 thereby preventing the accidental removal of the hasp.

The length of the bag 19 in the closed position of Figure 1 extending beyond the flare 21 should not be sufficient to permit the canvas bag to extend laterally beyond the flare. It has been found that should this occur, the trailing characteristics of the container are seriously impaired due to the uneven air drag occurring over the circumference of the flare.

Figure 5 illustrates a container having the same trailing characteristics as the container illustrated in Figures 1 and 2 but having larger capacity due to the fact that there is no necking of the canvas bag inside the rubber skirt as in the construction of Figures 1 and 2. The container shown in Figure 5 provides an exceedingly quick and secure method of closing the skirt 34.

The rubber skirt 34 has no flare but instead has a plurality of tabs or extensions 35 which are integral parts of the skirt. Each tab has on opening 36 adapted to receive straps 37 and 37' which may be of lengths of ordinary V belting.

The lid 38 has a cup-shaped base 39 adapted to fit in and tightly close the bottom of skirt 34. The lower edge of lid 38 flares outwardly at 40 to present an air drag surface similar to the flare 21 of Figure 1. Lid 38 also has corresponding curved slots 41 to receive tabs 35. The number of tabs should be sufficient to provide a tight closure and ample support for the lid. The tabs should also be equally spaced so that any slot 41 may be placed over any tab 35 with consequent correct alignment of the remaining slots and tabs.

It will be understood that the amount of flare required is dependent on the operating conditions; therefore, with the construction shown in Figure 5, it is possible to utilize the same dome and skirt over a wide range of air speeds and loads by using one of an assortment of lids having identical fastening devices but with different size flares. For example, lid 38 could be interchanged with another lid having a flare extending only to the dotted line 33.

The locking device may consist of two lengths (in the case of a skirt having 4 tabs) of strong flexible non-metallic material such as ordinary rubber belting. Each length of belting is suitably notched near its middle to receive the correspondingly transverse notched section of the other length (Figure 7) and both lengths may be bolted or riveted to the center of the cup section 39 of the lid using rivet 42, burr 43 and washer 44. Suitable reinforcing ribs 45 formed integral with the lid serve as guides for inserting the straps and effectively maintain the circular shape of the lid and skirt.

An alternate method of securing the fastening device is shown in Figure 8 in which the end 46 of one strap after insertion through a tab (not shown) is riveted to the flare by rivet 47. This latter method prevents the lid from being completely removable and also lessens the time required to open and close the container since only three tabs are disconnected instead of four. In this latter case the rivet 42' only secures the two straps to each other and does not extend through the lid.

Figure 9 illustrates another method of securing a lid to the rubber skirt of a cargo container. Skirt 48 of Figure 9, which is generally similar to skirt 20 of Figure 1, has a lip 49 extending inwardly from the flare 21'. Lid 50, which may be made of the same material as the skirt 48, namely, a combination of heavy duck and rubber, has a circular bottom 51 with slots 52 and a strong annular rim 53 disposed at right angles to the bottom and integral with it. In the closed position, rim 53 seats inside of lip 49 and effectively seals the opening in the skirt. This sealing becomes tighter with increased internal pressure on the circular bottom of the lid as will be more fully explained hereinafter.

Angular eyes 54 are riveted through plates 55 to skirt 48. The eyes, which may be made of suitably bent bar stock, protrude inwardly from the skirt and then bend downwardly towards the bottom of the skirt. The slots 52 in lid 50 are adapted to receive the eyes. Slotted reinforcing plates 56 are riveted over each of the slots by means of rivets 57. The lid is inserted in position by forcing one of the eyes 54 through one slot and reinforcing plates 56. Additional pressure on the outside of the lid forces the rim 53 past the lip 49 and permits the remaining eyes 54 to protrude from the corresponding slots 52.

The fastening device in this case may consist of lengths of flat rubber belting 58 riveted or bolted to the center of the lid by rivet 57'. After the lid proper has been forced in place the ends 46' of each strap are inserted through the protruding portion of the eye 54.

A handle 59 which may be of leather, rubber belting or other suitable material is riveted to the inner surface of the rim 53 and to the body 51 of the lid. It is essential that one end of the handle 59 be attached to the rim of the lid 53 in order that the rim may be pulled inwardly to disengage from lip 49. The handle is secured to the lid by rivets 60.

Figure 12 illustrates a modified lid construction which is somewhat similar to that shown in Figure 9, but this type depends entirely upon the expanding action of pressure against its inside surface to prevent disengagement.

One or more handles 59 of material similar to the handle of Figure 10 may be provided to enable the lid to be readily removed.

In Figure 9 the eyes 54 prevent the lid from being pushed too far into the skirt. It is possible to eliminate these metallic eyes entirely by enlarging the flare slightly as shown at 21², Figure 12, and providing an annular groove 61 having an inner shoulder 62 and an outer lip 49'.

Lid 50' may be identical to lid 50 except that no slots are cut therein and no reinforcing plates are added.

Inner shoulder 62 holds the lid in its proper place and lip 49' provides a seat which effectively prevents the lid from opening when pressure is exerted outwardly on the inside of the lid. Figure 14 shows the position taken by the lid when such pressure is applied and illustrates the locking and sealing action of the rim 53 or 53' against the lip 49'. It is obvious that when the center portion of the lid is pushed outwardly, the outer edge of the rim 53' will be expanded entirely around its circumference thus preventing further displacement. As soon as this pressure has been removed, the resilient rubber construction of the lid permits it to resume its former shape at once.

To remove the lid, therefore, it is necessary to pull on the handle 59 in the direction indicated by the arrow in Figure 13 until a portion of the rim 53' disengages the lip 49' by shifting radially toward the center after which a longitudinal pull removes the lid entirely.

Spinning and whipping have proved to be extremely dangerous characteristics of an air-dragged object. Excessive spinning not only induces violent whipping motion but renders the operator's duties of releasing and hauling in the container extremely difficult and dangerous. Whipping at times may be so violent that the container will wrap itself around the tail group of the aircraft thereby throwing the plane completely out of control.

Insufficient air drag, improper location of the center of pressure with respect to the center of gravity and irregular shape of the rubber skirt or body of the container are the fundamental causes of spinning and whipping.

The term "center of pressure" signifies for the purposes of this invention, the point, plane, or area as the case may be, at which the air drag may be considered to be effectively concentrated.

Stability and freedom from spinning are attained by means of the increased air drag at the rear of the container which results from the location of the center of pressure near the trailing edge in accordance with well known aerodynamic principles. The flare, whether integral with the skirt as in Figures 1, 9, 12 or integral with the lid as in Figure 5 provides the desired stability by acting as a spoiler or air brake.

The construction shown in all the various forms further insures stability by reinforcing the skirt and maintaining its circular shape so that the air drag over the flare is circularly uniform.

This is accomplished in Figure 1 by the thick flare and in Figure 5 by the strong lid and reinforcing ribs and in Figures 9 and 12 by the flare and lid.

When a loaded container weighing as much as 100 lbs. is dropped from an aircraft traveling at about 100 M. P. H., the impact shock is extremely great and often results in damage to the container and contents particularly when delivery is made on a concrete runway or rocky ground. This damage may destroy its circular shape.

It has been found that any metallic reinforcement in the rubber skirt or flare becomes bent or out of shape after one or two deliveries, and it is, therefore, essential to reduce all metallic fittings to a minimum or to eliminate them entirely.

The fastening devices of Figures 1, 5 and 12 likewise assist stability in that being non-metallic they prevent permanent distortion of the skirt, lid and flare after severe impact, and thereby insure the retention of the uniformly circular shape which, as noted above, is so important aerodynamically to stable trailing. Should the metallic fittings of Figure 9 become bent, stability will not thereby be adversely affected.

This heavy flare also retains its circular shape should the container be stored on its side for any length of time.

It is very desirable that the fastening devices be located in a protected position so that they will not be damaged on impact with the ground and so that there is a minimum of interference with the uniform flow of air over the exterior surface of the container. The strong flare and concave lid design of Figures 9 and 12 provide this protection as do the concave lid and ribs of Figure 5 even should the container strike the ground bottom end first.

In air pick-up operations, it is essential that the operator be able to open and close the container on board the airplane in rough air even though the container has become coated with frozen mud or snow.

The use of flexible rubber straps, which may be quickly inserted and removed from the eyelets, permits easy access to the contents and container under the most adverse conditions of weather and usage.

It will thus be seen that I have provided a rugged cargo container which will trail behind an aircraft without oscillating or spinning when being pulled into the aircraft or lowered from it, and which may be opened and closed with a minimum of effort.

Having thus described my invention, I claim:

1. In an aerial cargo container, a container assembly comprising a flexible cylindrical body member, a forward closure for said body member, a towing connection on said forward closure, a rearward closure for said body member, said rearward closure being of sufficiently greater outside diameter than said body member to increase the air drag of the container as it is towed through the air.

2. In a shock absorbing transfer container, a dome, a towing connection attached thereto, a flexible skirt attached to said dome, said skirt being constructed of rubberized material and having a larger outside diameter at its trailing edge than at the edge attached to said dome, a canvas pouch attached to said dome, a strap attached to and surrounding said pouch, said strap being constructed of rubberized duck, a staple attached to said pouch, a hasp attached to said strap adapted to fit over said staple when said canvas bag is closed, said staple having sufficient clearance to receive the free end of said strap after the staple has been inserted in the hasp and an enlargement at the outer edge of said canvas bag whereby it is prevented from being drawn through said strap when in a closed position.

3. In an air cargo container, a cylindrical elongated container assembly comprising a nose piece, a towing connection attached thereto, a flexible body member, a plurality of tabs on the rear edge of said body member, said tabs adapted each to receive a fastening device, a lid adapted to receive said tabs and having a portion thereof of substantially greater diameter than the diameter of said body member, said lid being constructed of flexible resilient material, and fastening devices attached to said lid adapted to be inserted one through each of the tabs after the lid is in place.

4. In a cargo container adapted to be trailed from an aircraft, a cylindrical elongated container assembly comprising a towing connection, a flexible body member attached thereto, said body member being flared at its trailing edge, an annular lip disposed inwardly at the trailing edge of said body member, a lid of flexible resilient material adapted to fit inside the lip, supporting members attached to said body member so constructed and arranged to cooperate with and protrude through slots in said lid when in a closed position and straps adapted to be inserted through eyes in said supporting members after the lid is in place.

5. In a cargo container adapted for air pickup and delivery systems, a cylindrical elongated container assembly comprising a dome, a towing connection attached thereto, a hollow flexible body member attached to said dome, said body member being flared at its trailing edge and having an annular recess, a flexible lid adapted to fit said recess, an annular lip on said lid, a handle attached to said annular lip, said annular lip being disposed angularly of the body of said lid and adapted to expand and thereby effectively seal the opening in said body member when pressure is exerted on the interior surface of said lid.

6. In transfer apparatus adapted for transferring cargo to and from an aircraft in flight, a cargo carrier assembly comprising a towing loop for towing the carrier assembly, a towing attachment, a hollow body for carrying the cargo, resilient protective means for said hollow body, said protective means having an annular flare extending outwardly therefrom to increase air drag, and means for securing said body to said protective means and towing attachment.

7. In a container for transferring loads to and from aircraft, a cylindrical elongated container assembly comprising a front adapted to be connected with a tow line, a cylindrical skirt engaging the front, a lid closing the rear of the skirt and having a flared edge extending beyond the radial limits of the skirt to form an air drag located to the rear of the point of tow line attachment and connections between the lid and the resilient skirt.

8. In a container to be dropped from an aircraft in flight, a container assembly comprising a hollow resilient cylindrical body member, a lid for the body member, closing the rear of said body member, cooperating fastening devices on the lid and body member, a thickened resilient rear edge for the body member of substantially larger diameter than that of the body member adapted to protect the fastening devices on impact with the ground.

9. In air cargo container construction, a container assembly having a front end having means for attachment of a tow line, a skirt of resilient material having intermingled layers of rubber and of fabric, of generally hollow cylindrical shape and having an opening for cargo intake at the rear end, a closure for the skirt attached to the skirt at intervals about the circumference of the rear end of the skirt and an outwardly flaring buffer ring attached to the rear end of the skirt, having intermingled layers of rubber and of fabric.

10. In a cargo container, a container front, means for attachment thereto of a tow line, a resilient generally cylindrical skirt attached to the front and terminating in an outwardly and rearwardly flaring buffer ring of interspersed rubber and fabric, a container sack within the skirt attached to the front and closure means for said sack separate from the skirt.

11. In air cargo container construction, a container assembly having a generally cylindrical container skirt having a front, an annularly flanged rear closure for the skirt, the annular flange of the closure interlocking with the surrounding lower end of the skirt, and locking devices between the skirt and the flange of the closure, one of the parts, the skirt or closure, being outwardly and rearwardly flared beyond the normal skirt diameter to catch the wind as the container is towed through the air.

12. In a cargo container adapted to be picked up and delivered by an aircraft in flight, a container assembly comprising a cargo carrying receptacle, closure means for said cargo receptacle including a strap and a hasp, a flexible skirt substantially enclosing the cargo carrying receptacle, a forward closure for said skirt, and means including a flare on said skirt for locating the center of pressure of the container near its trailing edge when moving through the air.

13. A cargo container adapted to be towed by an aircraft in flight having a flexible cargo carrying receptacle, a rearward closure for said receptacle, and means including a flare so constructed and arranged at the trailing edge of said receptacle that the force of the air pressure when said container is moving through the air is concentrated at the trailing edge of the container.

14. In a cargo container for air pick-up and delivery systems, a container assembly comprising a towing connection, a hollow cylindrical body member having substantially the same outside diameter over the greater part of its length, said body member progressively increasing in diameter at its trailing end to form an air brake for destroying the air flow around the trailing end.

15. In a shock absorbing transfer container, a cylindrical elongated container assembly comprising a dome, a towing connection attached thereto, a flexible skirt attached to said dome, said skirt being constructed of rubberized material and having a larger outside diameter at its trailing edge than at the edge attached to said dome, a canvas pouch attached to said dome, a strap attached to and surrounding said pouch, said strap being constructed of rubberized duck, a staple attached to said pouch, and a hasp attached to said strap adapted to fit over said staple when said pouch is closed, said staple having sufficient clearance to receive the free end of said strap after the staple has been inserted in the hasp.

16. A cargo container adapted to be picked up and delivered by an aircraft in flight having a flexible tubular body member, a towing connection attached to the forward end of said body member, and a circular air brake attached to the trailing end of said body member so constructed and arranged that the flow of air over the trailing end of the container is disturbed sufficiently to cause a concentration of air drag at the trailing end of the container.

17. In a cargo container, a container assembly comprising a front end having means for attachment to a tow line, a skirt of resilient material having intermingled layers of rubber and fabric of generally hollow cylindrical shape, and an outwardly flaring buffer ring forming a part of the skirt, the buffer ring having intermingled layers of rubber and of fabric.

18. In a cargo container, a cylindrical elongated container assembly comprising a front end having means for attachment to a tow line, a skirt of resilient material having intermingled layers of rubber and fabric of generally hollow cylindrical shape, a closure for the skirt attached to the skirt at intervals about the circumference of the rear end of the skirt and an outwardly flaring buffer ring attached to the closure, said buffer ring having intermingled layers of rubber and fabric.

19. In a cargo container adapted to be towed by or dropped from an aircraft in flight, a container assembly comprising a pouch member to hold the cargo, a towing connection on said pouch, a skirt of resilient material surrounding the pouch member and extending substantially the full length of the pouch member, a thickened resilient rear edge for the skirt extending radially outwardly, adapted to increase the air drag and protecting the edge on impact with the ground and preventing permanent deformation of the skirt after impact with the ground, and means for connecting said pouch to said skirt.

20. In a container to be dropped from an aircraft in flight, a cylindrical elongated container assembly comprising a hollow resilient body member having an open end, a combined lid and spoiler for the body member having an outwardly flared rim, said lid being constructed of resilient material, and resilient flexible fastening devices for holding the lid in position closing the open end of said body member.

21. In air cargo container construction, a container assembly having a towing front closure with a towing connection thereon, a hollow resilient body member, a plurality of eyelets thereon, a concave lid for said body member having slots cooperating with said eyelets, and resilient thongs in the concave portion adapted to be inserted in said eyelets.

HYDE W. BALLARD.

REFERENCES CITED

The following references are of record in the file of this patent:

UNITED STATES PATENTS

| Number | Name | Date |
|---|---|---|
| 543,127 | Byers | July 23, 1895 |
| 1,029,666 | Campbell | June 18, 1912 |
| 1,185,710 | Perrin | June 6, 1916 |
| 1,338,970 | Burton et al. | May 4, 1920 |
| 1,538,112 | Haubroe | May 19, 1925 |
| 1,639,418 | Washburn | Aug. 16, 1927 |
| 1,727,880 | Hoeft | Sept. 10, 1929 |
| 1,818,956 | Adams | Aug. 11, 1931 |
| 1,824,550 | Jacobs et al. | Sept. 21, 1931 |
| 1,825,329 | Adams | Sept. 29, 1931 |
| 2,028,337 | Lane | Jan. 21, 1936 |
| 2,036,876 | Kraft | Apr. 7, 1936 |
| 2,141,536 | Kelton | Dec. 27, 1938 |
| 2,298,688 | Du Pont | Oct. 13, 1942 |
| 2,324,146 | Frazer | July 13, 1943 |